US009406297B2

(12) United States Patent
Gardner et al.

(10) Patent No.: US 9,406,297 B2
(45) Date of Patent: Aug. 2, 2016

(54) APPLIANCES FOR PROVIDING USER-SPECIFIC RESPONSE TO VOICE COMMANDS

(71) Applicant: General Electric Company, Schenectady, NY (US)

(72) Inventors: William Everette Gardner, Louisville, KY (US); Joel Erik Hitzelberger, Louisville, KY (US); Keith Wesley Wait, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 198 days.

(21) Appl. No.: 14/066,936

(22) Filed: Oct. 30, 2013

(65) Prior Publication Data
US 2015/0120294 A1    Apr. 30, 2015

(51) Int. Cl.
G10L 15/26    (2006.01)
G10L 15/22    (2006.01)
G10L 17/00    (2013.01)

(52) U.S. Cl.
CPC ............... G10L 15/26 (2013.01); G10L 15/22 (2013.01); G10L 17/00 (2013.01); G10L 2015/223 (2013.01); G10L 2015/227 (2013.01)

(58) Field of Classification Search
USPC .................................. 704/270, 275, 235, 243
See application file for complete search history.

(56) References Cited

U.S. PATENT DOCUMENTS

| | | | | |
|---|---|---|---|---|
| 5,375,063 | A * | 12/1994 | Peck ..................... | D05B 19/02 112/277 |
| 5,748,843 | A * | 5/1998 | Peck ..................... | D05B 19/02 112/277 |
| 6,230,137 | B1 * | 5/2001 | Has et al. ............... | 704/275 |
| 6,456,977 | B1 * | 9/2002 | Wang .................... | 704/275 |
| 6,826,267 | B2 * | 11/2004 | Daum .................. | H04L 12/2803 340/12.53 |
| 6,937,984 | B1 * | 8/2005 | Morgan et al. ........ | 704/270 |
| 7,139,716 | B1 * | 11/2006 | Gaziz ................... | H04L 12/2803 704/231 |
| 8,250,871 | B2 | 8/2012 | Kwon | |
| 8,572,772 | B2 * | 11/2013 | Wolf ..................... | E03C 1/057 4/623 |
| 8,744,859 | B2 * | 6/2014 | Yang .................... | F25D 29/00 704/270 |
| 2001/0041982 | A1 * | 11/2001 | Kawasaki et al. .... | 704/275 |
| 2002/0077772 | A1 * | 6/2002 | Squibbs ............... | G06F 3/011 702/159 |
| 2002/0193989 | A1 * | 12/2002 | Geilhufe et al. ....... | 704/208 |
| 2003/0093281 | A1 * | 5/2003 | Geilhufe et al. ....... | 704/275 |

(Continued)

FOREIGN PATENT DOCUMENTS

CN            103271644 A      9/2013
KR            100889121 B1     3/2009

(Continued)

Primary Examiner — Edgar Guerra-Erazo
(74) Attorney, Agent, or Firm — Dority & Manning, P.A.

(57) ABSTRACT

Generally the present disclosure is directed to appliances that provide a user-specific response to a received voice command. In particular, the appliance can store a plurality of voice samples respectively associated with a plurality of users. The appliance can also store one or more preferences for each of the plurality of users. For example, the preferences can be input by the user and/or learned or inferred over time. When the appliance receives a human speech signal or voice command, it can match the received speech signal against one or more of the plurality of voice samples to identify the user. The preferences stored and associated with the identified user can then be obtained and the appliance can perform any requested operations in accordance with the obtained preferences. In such fashion, the appliance can provide a user-specific response to a received voice command.

19 Claims, 6 Drawing Sheets

(56) References Cited

U.S. PATENT DOCUMENTS

| | | | |
|---|---|---|---|
| 2003/0109938 A1* | 6/2003 | Daum | H04L 12/2803 700/11 |
| 2004/0160335 A1* | 8/2004 | Reitmeier | A47J 31/4407 340/4.12 |
| 2005/0151620 A1 | 7/2005 | Neumann | |
| 2006/0093097 A1* | 5/2006 | Chang | H04M 3/5183 379/88.01 |
| 2007/0081696 A1 | 4/2007 | Brennan et al. | |
| 2007/0271512 A1* | 11/2007 | Knight | G06F 3/0481 715/700 |
| 2008/0035241 A1* | 2/2008 | Wittbold | A01K 7/06 141/361 |
| 2009/0056011 A1* | 3/2009 | Wolf | E03C 1/057 4/623 |
| 2009/0326957 A1* | 12/2009 | Yang | F25D 29/00 704/275 |
| 2010/0204832 A1 | 8/2010 | Choi et al. | |
| 2012/0232903 A1 | 9/2012 | Cenedese et al. | |
| 2013/0238326 A1* | 9/2013 | Kim | G06F 3/167 704/231 |
| 2013/0283183 A1* | 10/2013 | Knight | G06F 3/0481 715/744 |
| 2014/0244267 A1* | 8/2014 | Levi | G06F 3/167 704/275 |
| 2015/0088518 A1* | 3/2015 | Kim | G06F 3/167 704/251 |

FOREIGN PATENT DOCUMENTS

| | | |
|---|---|---|
| KR | 20100013555 A | 2/2010 |
| TW | M348218 U | 1/2009 |

* cited by examiner

APPLIANCES FOR PROVIDING USER-SPECIFIC RESPONSE TO VOICE COMMANDS

The present disclosure relates generally to appliances. More particularly, the present disclosure relates to appliances configured to operate according to user-specific preferences in response to a voice command.

BACKGROUND OF THE INVENTION

Recent advances in consumer appliances have provided additional features to appliances that enhance efficiency, ease of use, practicality, or other factors that increase user satisfaction.

However, an appliance that includes a large number of additional features or options can be challenging to operate for a novice user or may require an undesirably large amount of instruction or configuration by the user in order to achieve a certain appliance operation. For example, certain appliances can require the user to select operational preferences by interfacing with a touch screen or a number of selectable buttons or require the users to sign in with a personal identification number or username and password.

As an example, a refrigerator can include a water dispensing system that offers operation according to a number of various parameters. For example, the user can be permitted to select a water temperature, a water flavoring, a water carbonation level, an ice style, or other configurable parameters. However, requiring the user to select a preference for each of these features at each instance in which the user interacts with the refrigerator can be cumbersome, challenging, and time-consuming.

One attempted solution to the difficulty of operating feature-rich appliances is for the appliance to be able to respond to voice commands. However, for households in which several different users reside and interact with an appliance, it can be difficult for the appliance to intelligently distinguish among commands from various users and provide an enhanced, personalized experience to each specific user.

Therefore, an appliance that provides user-specific preferences in response to voice commands is desirable.

BRIEF DESCRIPTION OF THE INVENTION

Additional aspects and advantages of the invention will be set forth in part in the following description, or may be apparent from the description, or may be learned through practice of the invention.

One aspect of the present disclosure is directed to a method for operating an appliance. The method includes receiving a human speech signal. The method includes identifying one of a plurality of enrolled users as a source of the human speech signal. The method includes obtaining one or more preset preferences associated with the identified enrolled user and stored in a memory. The method includes converting the human speech signal to textual information. The method includes determining one or more appliance operations requested by the human speech signal based on the textual information. The method includes performing the one or more appliance operations in accordance with the one or more preset preferences.

Another aspect of the present disclosure is directed to an appliance. The appliance includes a speech-to-text module configured to convert a human speech signal into textual information. The appliance includes a user identification module configured to identify one of a plurality of enrolled users based on an analysis of the human speech signal. The appliance includes a feature processing module configured to determine one or more requested appliance actions based on the textual information. The appliance is configured to perform operations. The operations include accessing from a memory one or more preferences associated with the identified enrolled user. The operations include performing the requested appliance actions in accordance with the one or more preferences.

Another aspect of the present disclosure is directed to an appliance. The appliance includes at least one processor and a non-transitory computer readable medium storing instructions that, when executed by the at least one processor, cause the appliance to perform operations. The operations include receiving a human speech signal from a user. The operations include determining whether the user can be identified based on the human speech signal. The operations include, when the user cannot be identified based on the human speech signal, performing an enrollment process to enroll the user. The operations include, when the user can be identified based on the human speech signal, accessing one or more previously obtained preferences associated with the user and performing one or more requested appliance operations in accordance with the one or more previously obtained preferences.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
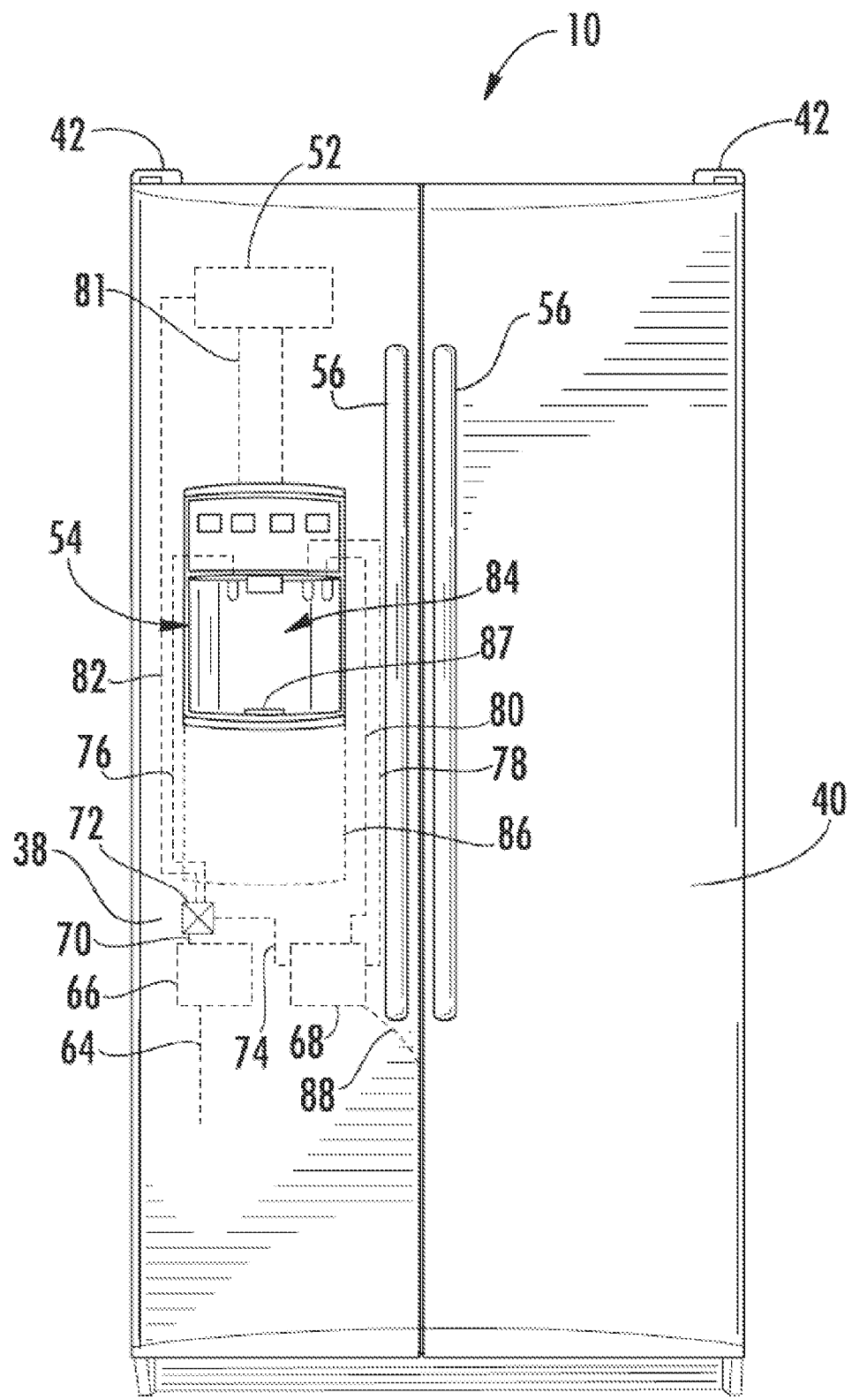
FIG. 1 provides a front view of an exemplary refrigeration appliance with its doors closed.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally the present disclosure is directed to appliances that provide a user-specific response to a received voice command. In particular, the appliance can store a plurality of voice samples respectively associated with a plurality of users. The appliance can also store one or more preferences for each of the plurality of users. For example, the preferences can be input by the user and/or learned or inferred over time. When the appliance receives a human speech signal or voice command, it can match the received speech signal against one or more of the plurality of voice samples to identify the user. The preferences stored and associated with the identified user can then be obtained and the appliance can perform any requested operations in accordance with the obtained preferences. In such fashion, the appliance can provide a user-specific response to a received voice command.

With reference now to the FIGS., exemplary embodiments of the present disclosure will now be discussed in detail. FIG. 1 is a perspective view of an exemplary refrigeration appliance 10 depicted as a side by side refrigerator in which dispenser structures in accordance with aspects of the present disclosure may be utilized. It should be appreciated that the appliance of FIG. 1 is for illustrative purposes only and that the present invention is not limited to any particular type, style, or configuration of refrigeration appliance, and that such appliance may include any manner of refrigerator, freezer, refrigerator/freezer combination, and so forth.

Figure 2:
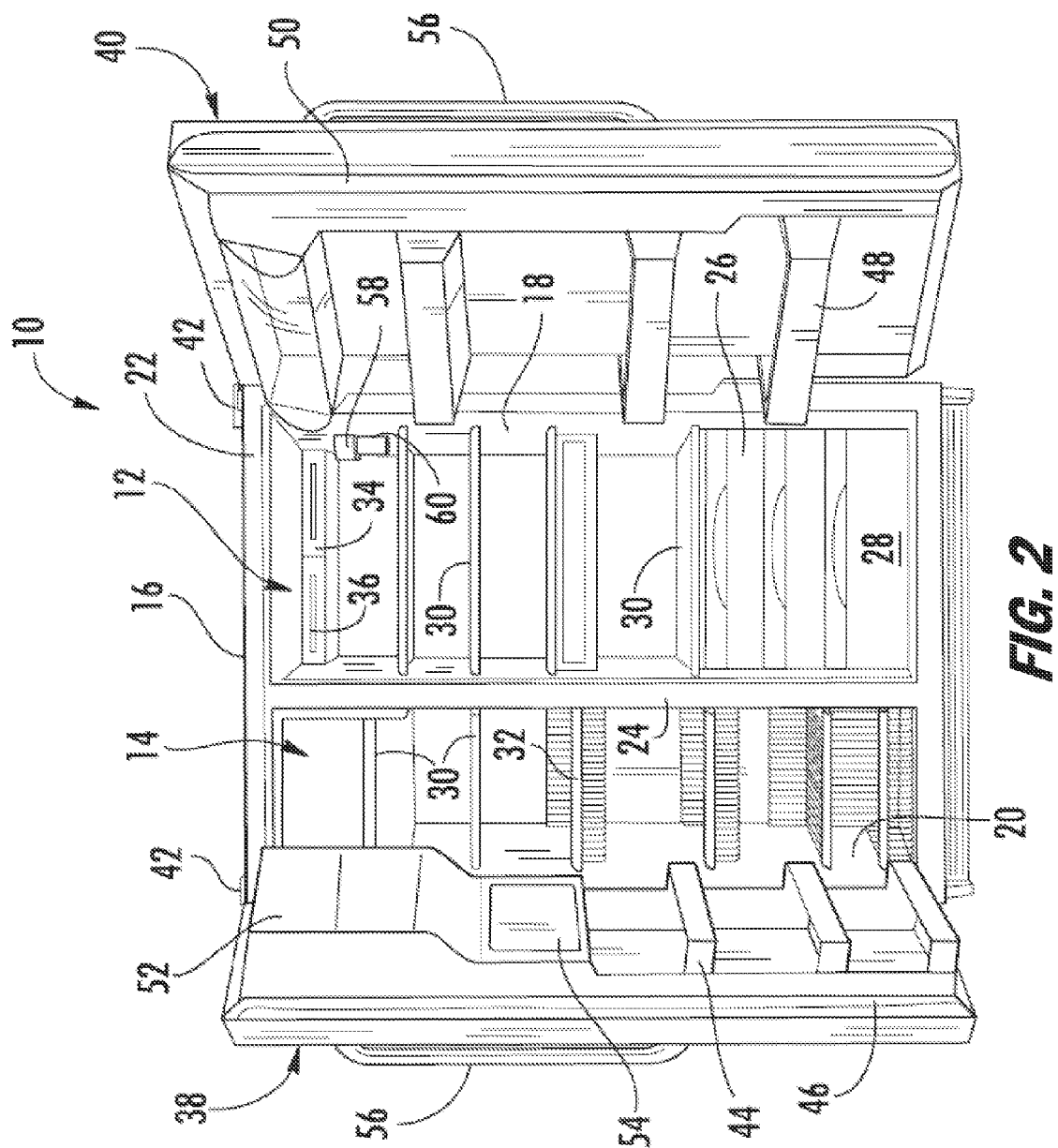
FIG. 2 provides a front view of the exemplary refrigeration appliance of FIG. 1 with its doors opened.

Referring now to FIG. 2, the refrigerator 10 comprises a refrigerated cabinet including a fresh food storage compartment 12 and a freezer storage compartment 14, with the compartments arranged side-by-side and contained within an outer case 16 and inner liners 18 and 20 generally molded from a suitable plastic material. In smaller refrigerators 10, a single liner is formed and a mullion spans between opposite sides of the liner to divide it into a freezer storage compartment and a fresh food storage compartment. The outer case 16 is normally formed by folding a sheet of a suitable material, such as pre-painted steel, into an inverted U-shape to form top and side walls of the outer case 16. A bottom wall of the outer case 16 normally is formed separately and attached to the case side walls and to a bottom frame that provides support for refrigerator 10.

A breaker strip 22 extends between a case front flange and outer front edges of inner liners 18 and 20. The breaker strip 22 is formed from a suitable resilient material, such as an extruded acrylo-butadiene-styrene based material (commonly referred to as ABS). The insulation in the space between inner liners 18 and 20 is covered by another strip of suitable resilient material, which also commonly is referred to as a mullion 24 and may be formed of an extruded ABS material. Breaker strip 22 and mullion 24 form a front face, and extend completely around inner peripheral edges of the outer case 16 and vertically between inner liners 18 and 20.

Slide-out drawers 26, a storage bin 28 and shelves 30 are normally provided in fresh food storage compartment 12 to support items being stored therein. In addition, at least one shelf 30 and at least one wire basket 32 can also be provided in freezer storage compartment 14.

The refrigerator features can be controlled by a controller 34 according to user preference via manipulation of a control interface 36 mounted in an upper region of fresh food storage compartment 12 and coupled to the controller 34. Alternatively, according to aspects of the present disclosure, user preferences with respect to refrigerator features can be inputted or recognized over time; associated with a particular user and stored in memory; and accessed and applied to operation in response to a voice command determined to have originated from a particular user.

As used herein, the term "controller" is not limited to just those integrated circuits referred to in the art as microprocessor, but broadly refers to computers, processors, microcontrollers, microcomputers, programmable logic controllers, application specific integrated circuits, and other programmable circuits, and these terms are used interchangeably herein.

A freezer door 38 and a fresh food door 40 close access openings to freezer storage compartment 14 and fresh food storage compartment 12. Each door 38, 40 is mounted by a top hinge 42 and a bottom hinge (not shown) to rotate about its outer vertical edge between an open position, as shown in FIG. 1, and a closed position. The freezer door 38 may include a plurality of storage shelves 44 and a sealing gasket 46, and fresh food door 40 also includes a plurality of storage shelves 48 and a sealing gasket 50.

The freezer storage compartment 14 may include an automatic ice maker 52 and a dispenser 54 provided in the freezer door 38 such that ice and/or chilled water can be dispensed without opening the freezer door 38, as is well known in the art. Doors 38 and 40 may be opened by handles 56 is conventional. A housing 58 may hold a water filter 60 used to filter water for the ice maker 52 and/or dispenser 54, although filter 60 may be located in other locations, such as within one of doors 38 or 40.

As with known refrigerators, the refrigerator 10 also includes a machinery compartment 63 (see FIG. 3) that at least partially contains components of refrigeration equipment 65 for executing a known vapor compression cycle for cooling air.

Figure 3:
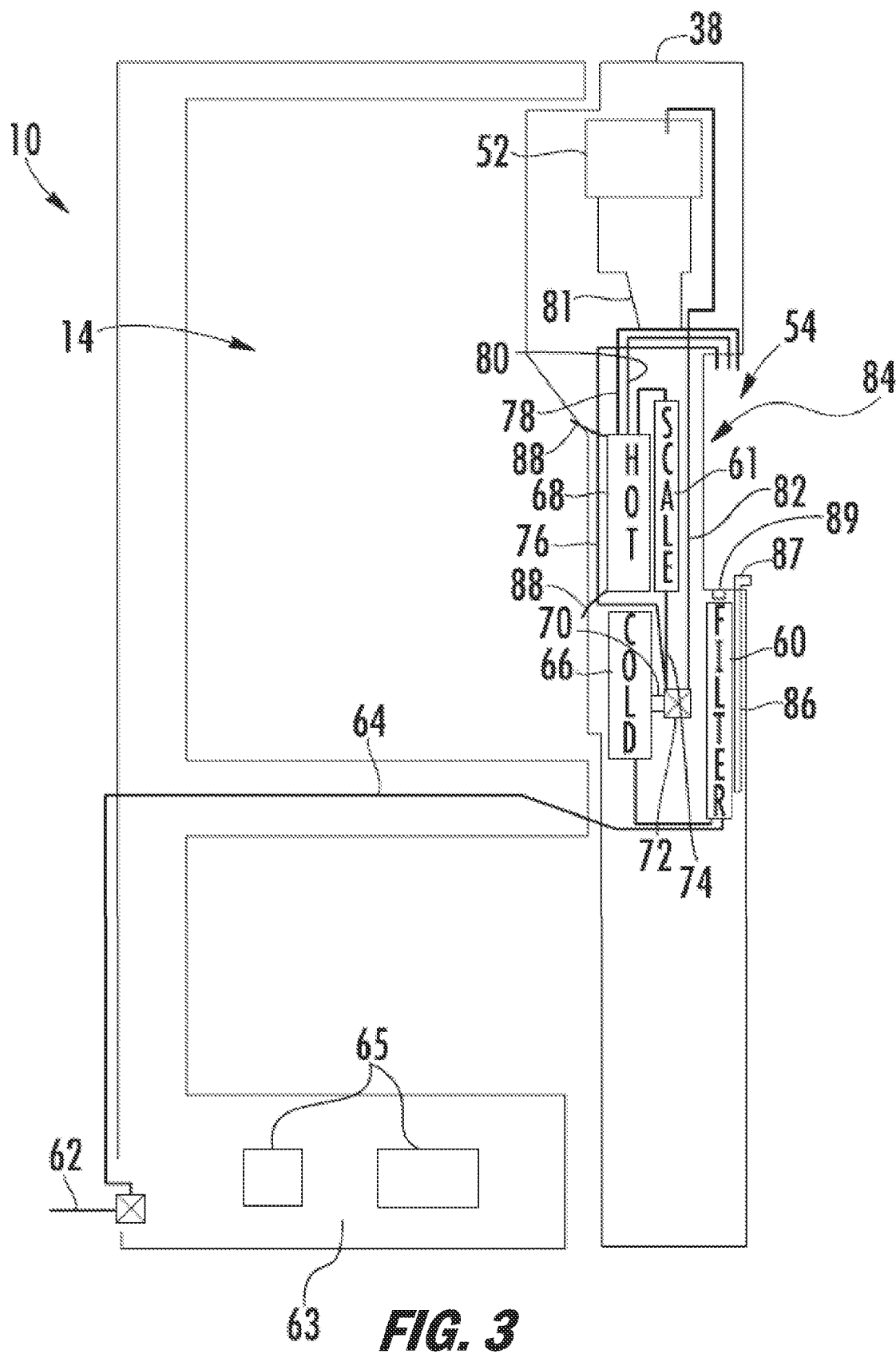
FIG. 3 provides a diagrammatical side view of the exemplary refrigeration appliance of FIG. 1, showing a water system according to certain aspects of the disclosure.

Referring now to FIG. 3, refrigeration appliance 10 comprises a refrigerated cabinet including a cooled storage compartment, in this case freezer compartment 14. Door 38 closes compartment 14, with dispenser 54 in an outer surface of the door. A water supply 62 is provided with an inlet portion 64 in communication with a cold water storage tank 66. Water supply 62 is at premises line pressure which can vary, for example, between about 20 and 120 psig. Typical premises line pressures are in the range of about 60 psig.

As shown, tank 66 is within door 38. Filter 60 is shown as within door 38 between inlet portion 64 and cold water storage tank 66 as well, but could be within the refrigeration appliance case, if desired. Also shown within door 38 is an ice maker 52. It should be understood that this elements could be located elsewhere as well. An optional anti-scaling device 61 could also be provided in the system if desired, in particular if water heating is to be performed.

Also shown within door 38 is a hot water storage tank 68. Hot water tank 68 may include a heating element located within a tank body. The tank body portions may be made of a plastic such as polyethersulfone and the like, and the portions may be connected by ultrasonic, thermal welding, etc. A metallic liner may be provided to shield the tank body portions from the heating element.

The heating element can be an electrical resistance heating device, a microwave heating device, an induction heating device, or any other suitable heating element for heating the water contained within hot water tank 68. Further, it will be appreciated that other heating elements can be included within the water dispensing system at various locations in addition to or alternatively to a heating element included in hot water storage tank 68. Each of such heating elements can optionally be controlled or energized by controller 34.

As to valving and routing of flow, if desired, cold water storage tank 66 may have an outlet 70 in communication with valving 72 to divide flow from the cold water storage tank into at least two flows: a first of the two flows being directed via a conduit 74 to hot water storage tank 68, a second of the two flows being directed via a conduit 76 to dispenser 54 for dispensing chilled water Conduit 78 places hot water tank 68 in communication with dispenser 54 for dispensing hot water, while optional conduit 80 does so for dispensing steam (for cleaning purposes). Valving 72 can also divide the flow from cold water storage tank 66 into a third flow which is directed via conduit 82 to ice maker 52. Ice bucket passage 81 allows ice cubes to be dispensed though dispenser 54. Accordingly, if all such functionality is provided, hot water, cold water, ice cubes and steam may be dispensed in dispenser 54, although all such items need not be used in any given application.

If desired, dispenser 54 may be cleanable via steam. If so, interior area 84 can be coverable by a slidable or pivotable cover 86 having a handle 87. Steam can thus be provided via conduit 80 to the dispenser interior area 84 for cleaning when the interior area is covered by cover 86. For safety purposes, a sensor 89 can be provided to sense whether cover 86 is in a closed position, whereby the steam function is disabled by controller 34 unless the sensor senses that the cover is in the closed position.

It may be desired to assist in removal of heat from hot water storage tank 68, to reduce energy required to chill the refrigeration appliance in general. Accordingly, a heat transfer element 88 may be provided (schematically shown in FIG. 3) for removing heat generated by the heating device in the tank 68. Element 88 may be at least one of a metallic tape or a foil adhesive for moving heat to the mullion or other exterior area of refrigerated appliance 10. If tank 68 is located in a door, the door mullion area 24 would be a likely location for the element to draw heat toward for exiting into the environment.

According to aspects of the present disclosure, water and ice of various styles and preferences can be dispensed by dispenser 54. For example, a water temperature and an ice style (e.g. crushed or cubed) can be controlled by a user of the refrigerator 10. As other examples, refrigerator 10 can include additional components to provide a selectable flavoring of the water (e.g. cherry, grape, cola) or to provide an adjustable carbonation level. For example, refrigerator 10 can further include one or more canisters containing various flavorings, a compressed gas canister, and/or an air compressor.

Figure 4:
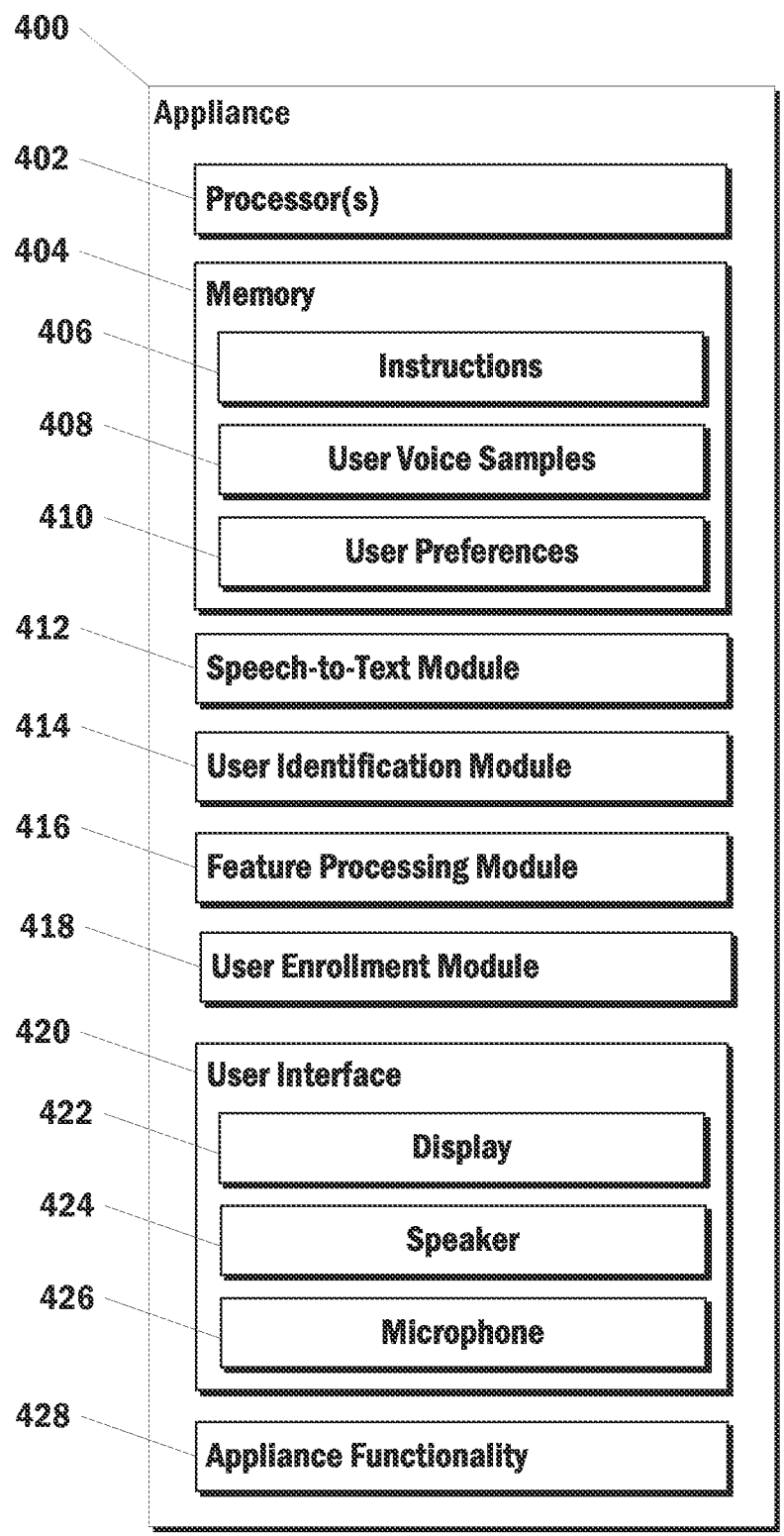
FIG. 4 provides a block diagram of an exemplary appliance according to an exemplary embodiment of the present disclosure.

FIG. 4 provides a block diagram of an exemplary appliance 400 according to an exemplary embodiment of the present disclosure. Appliance 400 can include one or more processors 402, a memory 404, a user interface 420, and appliance functionality 428.

As used herein, an appliance can be any machine or device for performing a specific task, including, without limitation, an air conditioner, an HVAC system, a security system, a ceiling fan, a clothes dryer, a clothes washer, a stereo system, a dishwasher, a refrigerator, a heater, a lighting system, a stove, an oven, a smoke detector, a television, a thermostat, a water heater, a humidity or temperature control device, a generator, an air filter device, an ice maker, a garbage disposal, a renewable energy system, an energy storage or delivery system, or any other suitable appliance. As an example, appliance 400 can be refrigerator 10 of FIGS. 1-3.

The processor(s) 402 can be any suitable processing device, such as a microprocessor, microcontroller, integrated circuit, or other suitable processing device. In some implementations, processor(s) 402 and memory 404 can be operatively connected and referred to as a controller.

The memory 404 can include any suitable computing system or media, including, but not limited to, non-transitory computer-readable media, RAM, ROM, hard drives, flash drives, or other memory devices. The memory 404 can store information accessible by processor(s) 402, including instructions 406 that can be executed by processor(s) 402 to control various components of appliance 400 and provide appliance functionality 428.

Memory 404 can also store data including, for example, one or more user voice samples 408 and one or more user preferences 410. User voice samples 408 can be human speech signals requested from a user, received, and stored in memory 404. User voice samples 408 can be used to later identify the source of a received voice command. The user voice samples 408 can be random speech strings or can be samples of user speech according to a template or standardized sentence or format.

User preferences 410 can describe one or more preferred settings for operating variables of appliance 400. As examples, for each of one or more enrolled users, user preferences 410 can describe a preferred water temperature, a preferred water flavoring, a preferred water carbonation level, a preferred ice style, or other preferences for other variable features of appliance 400. Each of user voice samples 408 and user preferences 410 can be associated with a particular user identifier so that they can be accessed when the user associated with such user identifier is identified as the source of the voice command.

According to an aspect of the present disclosure, appliance 400 can implement various modules in order to perform aspects of the present disclosure. For example, appliance 400 can include a speech-to-text module 412, a user identification module 414, a feature processing module 416, and a user enrollment module 418.

It will be appreciated that the term "module" refers to computer logic utilized to provide desired functionality. Thus, a module can be implemented in hardware, application specific circuits, firmware and/or software controlling a general purpose processor. In one embodiment, modules are program code files stored on the storage device, loaded into memory and executed by a processor or can be provided from computer program products, for example computer executable instructions, that are stored in a tangible computer-readable storage medium such as RAM, hard disk or optical or magnetic media.

Appliance 400 can implement speech-to-text module 412 to convert a human speech signal into textual information. Speech-to-text module 412 can be speaker independent or can be speaker dependent by using, for example, user voice samples 408 as training for the module 412. In some implementations, speech-to-text module 412 can be a component of a vocalizer included in appliance 400. As another example, in some implementations, speech-to-text module 412 can communicate over a wide area network with a server providing cloud processing of audio signals in order to convert the human speech signal into textual information.

Appliance 400 can implement user identification module 414 to identify a source or speaker of a received human speech signal. In particular, user identification module 414 can compare the received human speech signal to the user voice samples 408 to determine whether the speaker of the speech signal can be identified. As an example, user identification module 414 can attempt to match one or more features, patterns, or other voice biometrics of the human speech signal with respect to each of the user voice samples 408 to identify the source of the human speech signal. In some implementations, user identification module 414 can be a component of a vocalizer included in appliance 400.

Appliance 400 can implement feature processing module 416 to determine one or more requested appliance actions or operations based on textual information provided by speech-to-text module 412. As an example, feature processing module 416 can transform the textual information into a plurality of tokens, including, for example, a subject, a verb, an object, or other suitable tokens and can determine the one or more requested actions based on the tokens. As another example, in some implementations, feature processing module 416 can communicate over a wide area network with a server providing cloud processing of the textual information in order to determine the one or more requested appliance operations.

Appliance 400 can implement user enrollment module 418 to enroll one or more new users into memory 404. In particular, in some implementations, user enrollment module 418 can be implemented to perform aspects of FIG. 5B, including, for example, obtaining a voice sample from the new user, obtaining one or more preferences from the new user, and associating the voice sample and preferences with a newly created user identifier in memory.

User interface 420 can include a display 422, a speaker 424, and a microphone 426. Display 422 can be any display device for showing information to the user, including an LED display, a projection display, a holographic display, or other displays. Speaker 424 can be any device that produces an audio signal based on a received electrical signal. For example, speaker 424 can include an electric-to-acoustic transducer. Microphone 426 can be any suitable device or circuitry for converting received audio signals into an electrical signal or other computer-readable format. For example, microphone 426 can include an acoustic-to-electric transducer or other sensor.

Figure 5A:
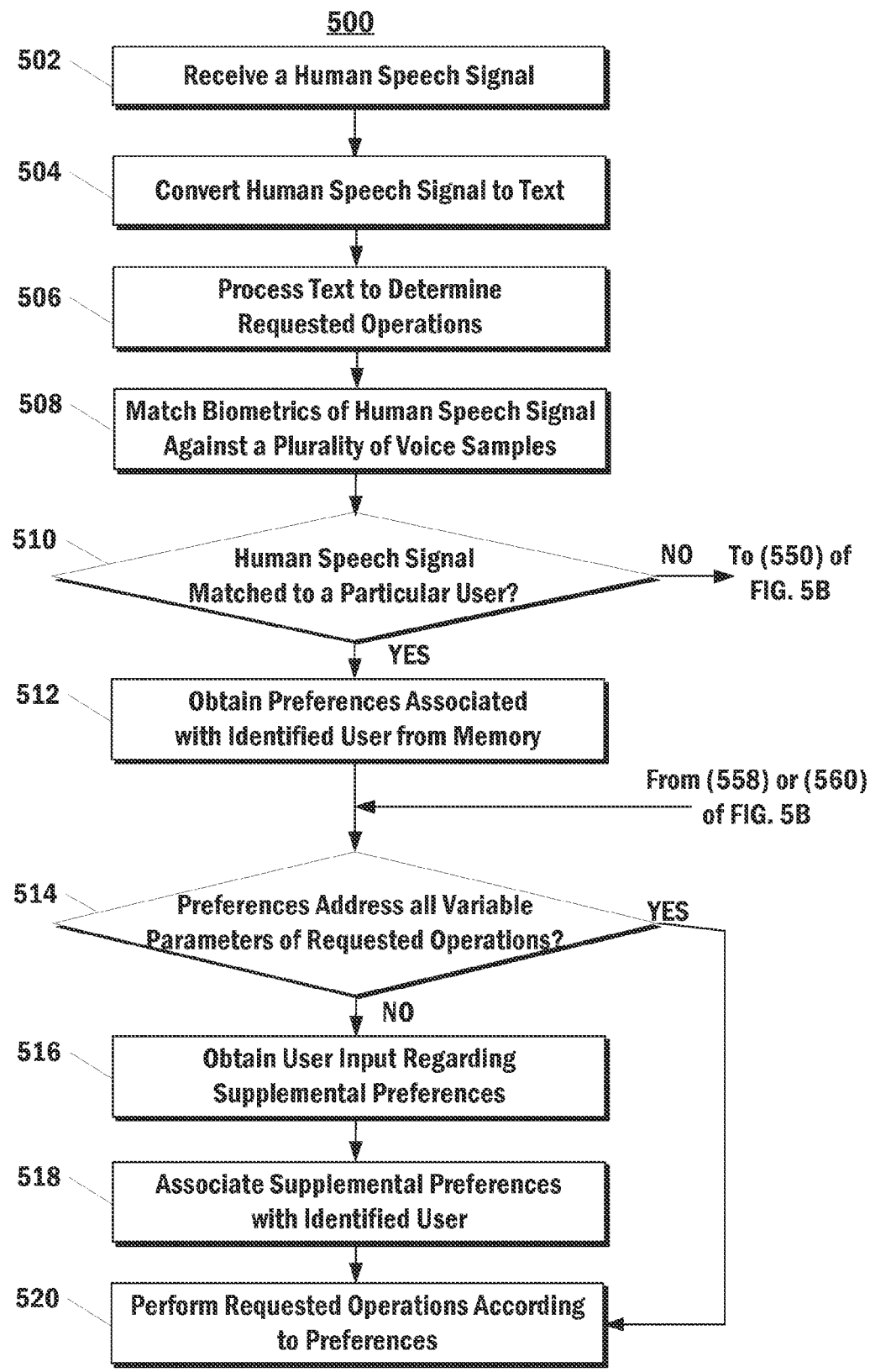
FIGS. 5A and 5B depict a flow chart of an exemplary method for operating an appliance configured to respond to a human voice command based on user-specific preferences according to an exemplary embodiment of the present disclosure.
Figure 5B:
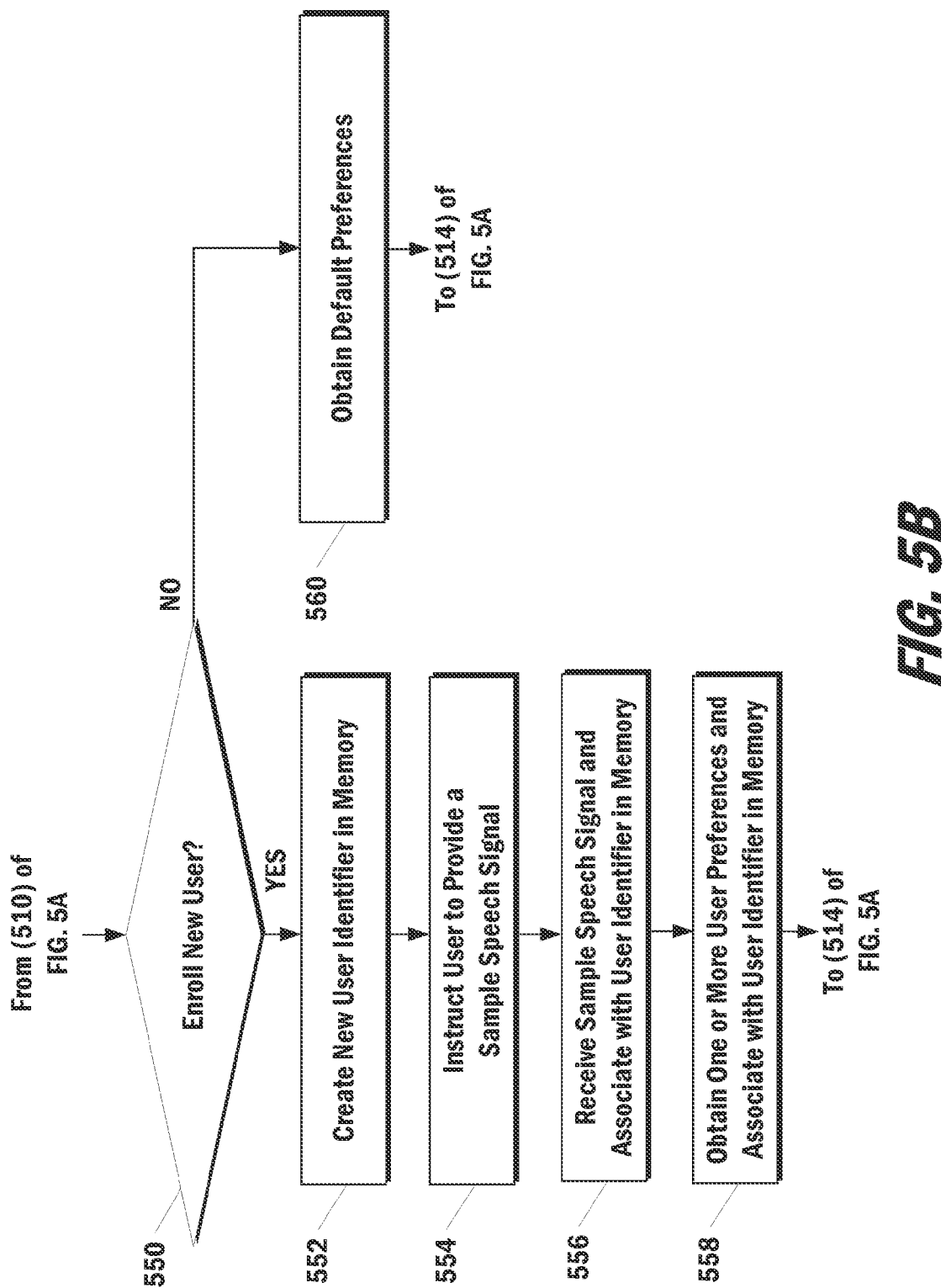

FIGS. 5A and 5B depict a flow chart of an exemplary method (500) for operating an appliance configured to respond to a human voice command based on user-specific preferences according to an exemplary embodiment of the present disclosure. Exemplary method (500) can be implemented by any suitable appliance, including, for example, refrigerator 10 of FIGS. 1-3 and appliance 400 of FIG. 4.

In addition, FIGS. 5A and 5B depict steps performed in a particular order for purposes of illustration and discussion. Those of ordinary skill in the art, using the disclosures provided herein, will understand that the various steps of method (500) can be omitted, adapted, performed simultaneously, and/or rearranged in various ways without departing from the scope of the present disclosure.

At (502) the appliance can receive a human speech signal. For example, a refrigerator can receive at a microphone a voice command from a user that requests that the refrigerator dispense ice and water.

At (504) the appliance can convert the human speech signal into textual information. As an example, the appliance can implement a speech-to-text module to convert the human speech signal into textual information. For example, the refrigerator can transform the speech command of "dispense ice and water" into textual information providing text of the words "dispense", "ice", "and", and "water".

At (506) the appliance can process the textual information formed at (504) to determine one or more appliance actions requested by the human speech signal. As an example, the appliance can implement a feature processing module to determine the one or more requested appliance actions. For example, at (506) the refrigerator can recognize the verb "dispense" and the objects "ice" and "water."

At (508) the appliance can attempt to identify the speaker of the human speech signal. As an example, the appliance can implement a user identification module at (508). For example, at (508) the appliance can attempt to match one or more voice biometrics of the human speech signal with respect to a plurality of voice samples. Each of the voice samples can have been previously obtained from and associated with a particular user or user identifier. Each user or user identifier for which a voice sample exists can be referred to as an enrolled user.

At (510) it can be determined whether the human speech signal was able to be matched to a particular enrolled user. For example, a confidence score or other indicator of a degree to which the human speech signal was matched to one or more voice samples can be analyzed to determine whether a particular enrolled user was able to be identified as the source of the human speech signal at (508).

If it is determined at (510) that a particular enrolled user was able to be identified as the speaker at (508), then at (508) one or more preferences associated with the identified user can be obtained from memory. As an example, the refrigerator can access or otherwise obtain any preset preferences for water and ice dispensing stored in memory and associated with the identified user.

However, if it is determined at (510) that a particular enrolled user was not able to be identified at (508), then method (500) can proceed to (550) of FIG. 5B. Referring now to FIG. 5B, at (550) it can be determined whether the new user should be enrolled. As an example, at each instance in which the speaker of the voice command cannot be identified, the user can be prompted via a user interface to select whether he or she wishes to be enrolled. As another example, enrollment of new users upon a failure to identify a particular speaker can be turned on and off through appliance system settings. In addition, in some implementations, the enrollment process can be performed upon a user request such that new users can enroll themselves without providing an initial voice command.

If it is determined at (550) that an enrollment process should be performed, then at (552) a new user identifier can be created and stored in memory. In particular, as noted above, a plurality of voice samples and preferred settings can be stored in the appliance's memory and keyed by a user identifier. Thus, at (552) a new user identifier can be created and associated with any further data or preferences collected from the new user.

At (554) the appliance can instruct the user to provide a sample speech signal. As an example, the appliance user interface can request that the new user recite a sample sentence or voice template. At (556) the sample speech signal can be received, for example, via a microphone and can be associated with the user identifier in memory. As another example, in addition or alternatively to the sample speech signal received at (556), the initial human speech signal received at (502) can be stored in memory and associated with the new user identifier created at (552).

At (558) the appliance can obtain one or more user preferences and associate such user preferences with the user identifier in memory. As an example, the appliance can obtain the one or more user preferences by requesting and receiving additional voice commands or via other aspects of the user interface such as, for example, a touch screen. For example, the obtained user preferences can be the new user's preferences for the most commonly used aspects of the appliance.

As another example, the obtained user preferences can be the new user's preferences regarding to the particular features requested by the human voice command received at (502).

For example, at (558) the refrigerator can request that the new user provide an indication of the temperature of the water desired and the style of ice desired. After (558), method (500) can return to (514) of FIG. 5A.

Referring again to (550) of FIG. 5B, if it is determined at (550) that the unidentifiable user should not be enrolled, then method (500) can proceed to (560) and obtain one or more default preferences. As an example, the one or more default preferences can be part of a default profile which is adjustable in the appliance system settings.

As another example, in some implementations, the appliance may have a plurality of default profiles with each default profile having varying default settings. Therefore, in such implementations, obtaining the default preferences at (560) can include selecting one of the plurality of default profiles. For example, the refrigerator may offer different default profiles based on time of day (e.g. defaulting to hot water for coffee in the morning while defaulting to cold water in the afternoon/evenings).

As another example, the default profiles can include a default juvenile profile and a default adult profile. More particularly, while the particular identity of the speaker may not have been able to be determined at (508), the appliance may still be able to determine that the speaker is a juvenile based on one or more characteristics or biometrics of the human speech signal. Therefore, a default juvenile profile with default juvenile preferences can be obtained at (560).

In particular, according to an aspect of the present disclosure, default juvenile preferences can take into account juvenile user safety. For example, if the appliance is an oven or stove, then the appliance can decline to operate based on juvenile voice commands. As another example, if the appliance is a refrigerator, it can ensure that any water dispensed as a result of a juvenile voice command is not scalding or otherwise hotter than a certain temperature. Furthermore, although juvenile safety settings are discussed with respect to FIG. 5B as a default profile, it will be appreciated that the juvenile safety settings or other user safety features can be applied to particular enrolled user profiles as well. After (560), method (500) can return to (514) of FIG. 5A.

Referring again to FIG. 5A, at (514) the appliance can determine whether the obtained preferences (e.g. the preferences obtained at (512), (558), or (560)) address all variable parameters of the requested operations. For example, the obtained preferences may have indicated a preferred water temperature and preferred ice style, but did not provide a preferred water flavoring or water carbonation level.

If it is determined at (514) that the preferences do address all variable parameters of the requested operations, then method (500) can proceed directly to (520) and perform the requested operations according to the preferences.

However, if it is determined at (514) that the obtained preferences do not address all variable parameters, then method (500) can proceed to (516). At (516) the appliance can obtain user input regarding one or more supplemental preferences. For example, the supplemental preferences can address the variable parameters that were identified at (514) as not having been addressed by the previously obtained preferences. As an example, the refrigerator may request additional input from the user with respect to a preferred water flavoring and a preferred water carbonation level. For example, the additional input can be received by voice command or via other aspects of the user interface.

At (518) the supplemental preferences can be associated with the identified user. For example, the supplemental preferences can be stored in memory and associated with a user identifier associated with the identified user. In such fashion, user-specific preferences can be learned or inferred over time. Further, in some implementations, the user can be provided the option at (518) as to whether the supplemental preferences are saved as permanent preferences. After (518), method (500) can proceed to (520) and perform the requested operations according to both the preset preferences and the supplemental preferences.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a refrigerator appliance that has a water dispensing system, the method comprising:
   receiving, by the refrigerator appliance, a human speech signal, wherein the human speech signal comprises a voice command that requests that the refrigerator appliance perform one or more dispensing operations, the one or more dispensing operations comprising dispensing at least one of ice and water;
   matching, by the refrigerator appliance, one or more biometrics of the human speech signal to one of a plurality of voice samples respectively associated with a plurality of enrolled users to identify one of the plurality of enrolled users as a source of the human speech signal;
   obtaining, by the refrigerator appliance, one or more preset preferences associated with the identified enrolled user and stored in a memory, wherein the one or more preset preferences provide one or more values respectively for the one or more variable parameters associated with the one or more dispensing operations;
   converting, by the refrigerator appliance the human speech signal to textual information;
   determining, by the refrigerator appliance, the one or more dispensing operations requested by the human speech signal based on the textual information; and
   performing, by the refrigerator appliance, the one or more dispensing operations in accordance with the one or more preset preferences, wherein performing the one or more dispensing operations comprises dispensing the at least one of ice and water that has the one or more values respectively for the one or more variable parameters.

2. The method of claim 1, further comprising obtaining, by the refrigerator appliance, one or more default preferences when one of the plurality of enrolled users cannot be identified as the source of the human speech signal, wherein the dispensing operations are performed by the refrigerator appliance in accordance with the one or more default preferences.

3. The method of claim 2, wherein obtaining, by the refrigerator appliance, one or more default preferences comprises:
   selecting, by the refrigerator appliance, one of a plurality of default profiles based on the human speech signal; and
   obtaining, by the refrigerator appliance, one or more default preferences associated with the selected default profile;
   wherein the plurality of default profiles include a default juvenile profile and a default adult profile.

4. The method of claim 1, further comprising enrolling, by the refrigerator appliance, a new user when one of the plurality of enrolled users cannot be identified as the source of the human speech signal, wherein enrolling, by the refrigerator appliance, the new user comprises:

obtaining, by the refrigerator appliance, a voice sample from the new user; and associating, by the refrigerator appliance, the voice sample with a user identifier associated with the new user.

5. The method of claim 4, wherein enrolling the new user further comprises obtaining, by the refrigerator appliance, a plurality of preferences to be stored and associated with the user identifier associated with the new user.

6. The method of claim 1, further comprising, prior to performing the one or more dispensing operations:

identifying, by the refrigerator appliance, at least a first parameter of the one or more variable parameters associated with the one or more dispensing operations that are not addressed by the one or more preset preferences; and obtaining, by the refrigerator appliance, from the identified enrolled user one or more supplemental preferences with respect to the first variable parameter;

wherein performing, by refrigerator appliance, the one or more dispensing operations comprises performing, by the refrigerator appliance, the one or more dispensing operations in accordance with the one or more supplemental preferences.

7. The method of claim 6, further comprising associating, by the refrigerator appliance, the one or more supplemental preferences with the identified enrolled user.

8. The method of claim 1, wherein the one or more variable parameters comprise a water temperature, a water flavoring, a ice style, or a water carbonation level, and wherein the one or more preferences comprises a preferred water temperature value, a preferred water flavoring value, a preferred ice style value, or a preferred water carbonation level value.

9. A refrigerator appliance comprising:

a water dispensing system, a speech-to-text system configured to convert a human speech signal into textual information, wherein the human speech signal comprises a voice command that requests that the refrigerator appliance perform one or more dispensing actions, and wherein the one or more dispensing actions comprise dispensing at least one of ice and water;

a user identification system configured to identify one of a plurality of enrolled users based on an analysis of the human speech signal, wherein the user identification system is configured to identify the one of the plurality of enrolled users by performing a matching routine with respect to the human speech signal and a plurality of voice samples respectively stored in a memory; and a feature processing system configured to determine the one or more requested dispensing actions based on the textual information;

wherein the refrigerator appliance is configured to perform operations, the operations comprising:

accessing from the memory one or more preferences associated with the identified enrolled user, wherein the one or more preferences describe one or more values for one or more variable parameters invoked by the one or more dispensing actions; and performing the one or more requested dispensing actions in accordance with the one or more preferences, wherein performing the one or more requested dispensing actions comprises dispensing the at least one of ice and water that has the one or more values respectively for the one or more variable parameters.

10. The refrigerator appliance of claim 9, further comprising a user enrollment system configured to enroll a new user when the user identification system is unable to identify one of the plurality of enrolled users based on the analysis of the human speech signal.

11. The refrigerator appliance of claim 10, wherein the user enrollment system is configured to enroll the new user by performing operations, the operations comprising:

receiving a voice sample from the new user;

receiving one or more new preferences from the new user; and associating the voice sample and the one or more new preferences with the new user in the memory.

12. The refrigerator appliance of claim 9, wherein the refrigerator appliance is further configured to perform further operations comprising accessing from the memory one or more default preferences when the user identification system is unable to identify one of the plurality of enrolled users based on the analysis of the human speech signal.

13. The refrigerator appliance of claim 9, further comprising a user interface; wherein the user interface comprises a display and a microphone.

14. A refrigerator appliance comprising:

a water dispensing system;

at least one processor; and a non-transitory computer readable medium storing instructions that, when executed by the at least one processor, cause the refrigerator appliance to perform operations, the operations comprising:

receiving a human speech signal from a user, wherein the human speech signal comprises a voice command that requests that the refrigerator appliance perform one or more dispensing operations, and wherein the one or more dispensing operations comprise dispensing at least one of ice and water;

determining whether the user can be identified based on the human speech signal, wherein determining whether the user can be identified based on the human speech signal comprises respectively matching one or more biometrics of the human speech signal against a plurality voice samples respectively associated with a plurality of enrolled users;

when the user cannot be identified based on the human speech signal, performing an enrollment process to enroll the user; and when the user can be identified based on the human speech signal:

accessing one or more previously obtained preferences associated with the user, wherein the one or more previously obtained preferences describe one or more values for one or more variable parameters associated with the one or more dispensing operations; and performing the one or more requested dispensing operations in accordance with the one or more previously obtained preferences, wherein performing the one or more requested dispensing operations comprises dispensing the at least one of ice and water that has the one or more values respectively for the one or more variable parameters.

15. The refrigerator appliance of claim 14, wherein performing the enrollment process to enroll the user comprises obtaining a voice sample from the user.

16. The refrigerator appliance of claim 14, wherein the non-transitory computer readable medium stores further instructions that, when executed by the at least one processor, cause the refrigerator appliance to perform further operations comprising:
converting the human speech signal to textual information; and
identifying the one or more requested appliance operations based on information.

17. The method of claim 1, wherein matching, by the refrigerator appliance, one or more biometrics of the human speech signal to one of the plurality of voice samples respectively associated with a plurality of enrolled users comprises determining, by the refrigerator appliance, a confidence score for each of the plurality of enrolled users, the confidence score for each enrolled user indicating a degree to which the human speech signal was matched to the one or more voice samples for such user.

18. The method of claim 1, further comprising:
enrolling, by the refrigerator appliance, a new user when one of the plurality of enrolled users cannot be identified as the source of the human speech signal, wherein enrolling, by the refrigerator appliance, the new user comprises associating the initial human speech signal with a new user identifier generated for the new user.

19. The method of claim 3, wherein selecting, by the refrigerator appliance, one of the plurality of default profiles based on the human speech signal comprises:
determining, by the refrigerator appliance based on an analysis of the human speech signal, that a speaker of the human speech signal is a juvenile; and
selecting, by the refrigerator appliance, the default juvenile profile, wherein the default juvenile profile includes one or more default juvenile preferences that improve juvenile user safety.

* * * * *